United States Patent
Yamaguchi et al.

(10) Patent No.: US 7,567,281 B2
(45) Date of Patent: Jul. 28, 2009

(54) SOLID STATE IMAGING DEVICE, METHOD FOR DRIVING THE SAME, AND CAMERA

(75) Inventors: Takumi Yamaguchi, Kyoto (JP);
Takahiko Murata, Osaka (JP);
Shigetaka Kasuga, Osaka (JP);
Takayoshi Yamada, Osaka (JP);
Yoshiyuki Matsunaga, Kyoto (JP);
Ryohei Miyagawa, Kyoto (JP)

(73) Assignee: Panasonic Corporation, Osaka (JP)

( * ) Notice: Subject to any disclaimer, the term of this patent is extended or adjusted under 35 U.S.C. 154(b) by 525 days.

(21) Appl. No.: 11/528,523

(22) Filed: Sep. 28, 2006

(65) Prior Publication Data

US 2007/0109432 A1    May 17, 2007

(30) Foreign Application Priority Data

Nov. 17, 2005    (JP)    ............................. 2005-333322

(51) Int. Cl.
*H04N 3/14*    (2006.01)
*H04N 5/335*    (2006.01)

(52) U.S. Cl. ....................... 348/308; 348/301; 348/310; 250/208.1

(58) Field of Classification Search ....................... None
See application file for complete search history.

(56) References Cited

U.S. PATENT DOCUMENTS 6,801,255 B2* 10/2004 Inui ........................... 348/241
7,148,927 B2* 12/2006 Ogura et al. ................. 348/281
2005/0094012 A1* 5/2005 Gomi et al. .................. 348/308
2008/0129851 A1* 6/2008 Kasuga et al. ............... 348/294
2009/0021625 A1* 1/2009 Sowa et al. .................. 348/308

FOREIGN PATENT DOCUMENTS

| JP | 04-000877 | 1/1992 |
| JP | 09-163234 | 6/1997 |
| JP | 2001-045375 | 2/2001 |
| JP | 2001-045378 | 2/2001 |

* cited by examiner

*Primary Examiner*—Ngoc-Yen T Vu
(74) *Attorney, Agent, or Firm*—McDermott Will & Emery LLP (57) ABSTRACT

A solid state imaging device includes an imaging area where a plurality of first pixels and a plurality of second pixels are respectively arranged in the form of a matrix, each of the first pixels and the second pixels having a photoelectric conversion portion and outputting a signal in accordance with brightness of incident light when selected; a plurality of first memories that respectively store signals of selected first pixels out of the plurality of first pixels; and a plurality of second memories that are respectively connected in parallel to the first memories and respectively store signals of selected second pixels out of the plurality of second pixels. The signals stored in the first memories and in the second memories are successively read to a horizontal signal line.

16 Claims, 8 Drawing Sheets

SOLID STATE IMAGING DEVICE, METHOD FOR DRIVING THE SAME, AND CAMERA

CROSS-REFERENCE TO RELATED APPLICATIONS

This application claims priority under 35 U.S.C. §119 on patent application Ser. No. 2005-333322 filed in Japan on Nov. 17, 2005, the entire contents of which are hereby incorporated by reference.

BACKGROUND OF THE INVENTION

The present invention relates to a solid state imaging device, a method for driving the same, and a camera, and more particularly, it relates to a solid state imaging device for use in a high-definition camera or the like, a method for driving the same, and a camera using the same.

Figure 7:
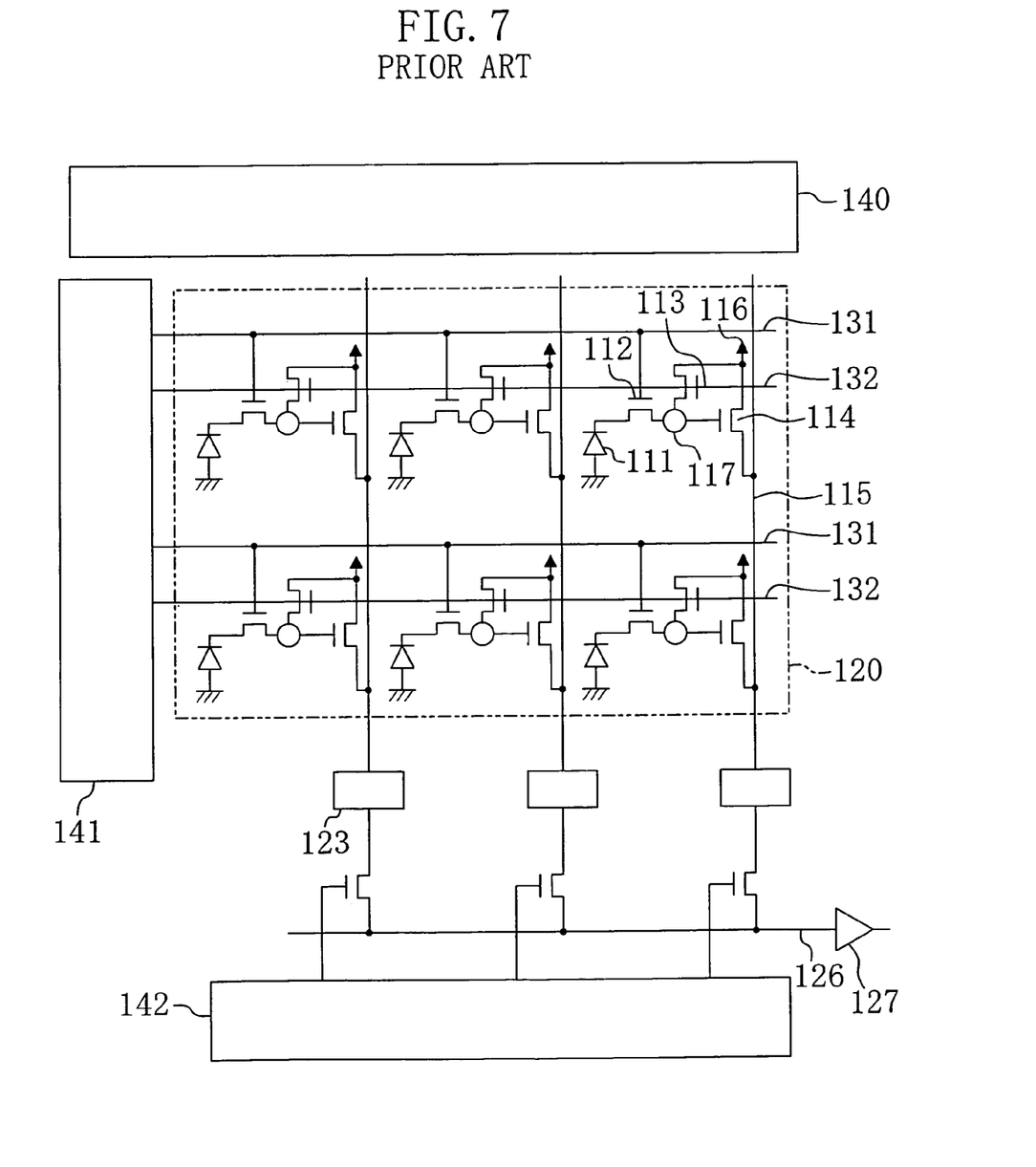
FIG. 7 is a circuit diagram of a conventional solid state imaging device.

FIG. 7 shows an exemplified conventional solid state imaging device including MOS transistors. As shown in FIG. 7, the solid state imaging device has an imaging area 120 where a plurality of amplifying unit pixels are two-dimensionally arranged. Each amplifying unit pixel includes a photodiode (PD) portion 111; a floating diffusion portion (FD) 117 connected to the PD portion 111 through a read transistor 112 for storing charge read from the PD portion 111; a reset transistor 113 for initializing the state of the FD portion 117; and a detection transistor 114 connected to the FD portion 117 for controlling the signal output of the pixel.

Each row of the amplifying unit pixels is selected by a vertical shift register 141 operated in accordance with a drive timing pulse sent from a timing generator circuit 140. Signals of the amplifying unit pixels of the selected row are stored in row memories 123. Thereafter, a horizontal shift register 142 is driven by a drive timing pulse sent from the timing generator circuit 140, so that the pixel signals stored in the row memories 123 can be successively output as device signals from an output amplifier 127 through a horizontal signal line 126.

Figure 8:
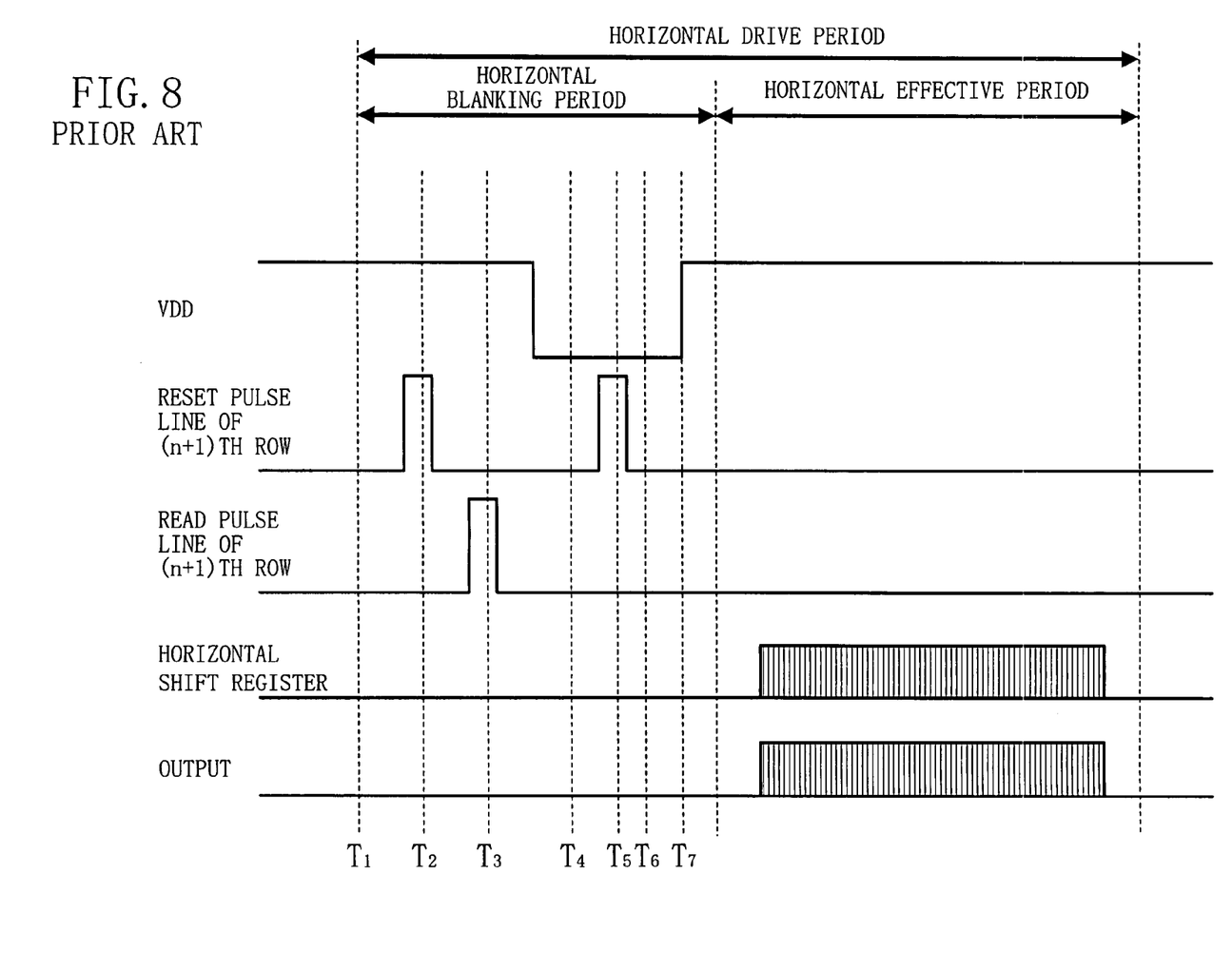
FIG. 8 is a timing chart for showing a driving state of the conventional solid state imaging device.

FIG. 8 is a timing chart in a horizontal drive period besides a vertical blanking period of the conventional solid state imaging device. A horizontal drive period is composed of a horizontal blanking period and a horizontal active period. The horizontal blanking period starts at timing $T_1$, a reset pulse is applied, at timing $T_2$, to a reset pulse line 132 on an nth row (wherein n is a positive integer) with a voltage of a $V_{DD}$ power supply 116 set to a high (H) level, so as to simultaneously reset the FD portion 117 and select the detection transistor 114 on the nth row. Thereafter, a read pulse is applied to a read pulse line 131 at timing $T_3$, so as to read the charge of the PD portion 111 to the FD portion 117. A signal corresponding to the read charge is stored in the row memory 123 through the detection transistor 114. Then, a reset pulse is applied, at timing $T_5$, to the reset pulse line 132 on the nth row with the voltage of the $V_{DD}$ power supply 116 set to a low (L) level, so as to set the potential of the FD portion 117 to a low level and place the detection transistor 114 on the nth row in an unselected state. The signals stored in the row memories 123 are successively output from the solid state imaging device by operating the horizontal shift register 142 during the horizontal active period.

In this manner, in the solid state imaging device having one row memory for one row of pixels correspondingly to each horizontal signal line 126, images are generally drawn by reading signals from pixels and storing them in memories in a horizontal blanking period included in a horizontal drive period besides a vertical blanking period and outputting the signals from the row memories in a horizontal active period included in the horizontal drive period besides the vertical blanking period (see, for example, Japanese Laid-Open Patent Publication Nos. 9-163234 and 4-877).

In the conventional solid state imaging device, if signals are read from pixels and the read signals are stored in row memories in the horizontal active period included in the horizontal drive period besides the vertical blanking period, signals of pixels on an (n+1)th row are overwritten on signals of pixels on the nth row remaining in the row memories 123, and therefore, an accurate image cannot be obtained and the image is disadvantageously degraded.

Although the horizontal drive period besides the vertical blanking period is described above, since an image is basically not drawn in the vertical blanking period, pixel signals may be read and the read signals may be stored in row memories in the horizontal active period included in the horizontal drive period as an exception.

In driving a solid state imaging device for a high quality high-definition image, however, all of the horizontal blanking period, the horizontal active period and the horizontal drive period as a sum of the horizontal blanking period and the horizontal active period are much shorter than in conventional technique. Therefore, it is necessary to rapidly perform an operation for reading signals from pixels and storing the read signals in row memories and an operation for outputting the signals from the row memories in a solid state imaging device for a high-definition image. Accordingly, signals stored in row memories exhibit unstable values, and hence, there arises a problem that the quality of an image created in accordance with the signals read from the row memories is largely degraded.

SUMMARY OF THE INVENTION

The present invention was devised to overcome the aforementioned conventional problems, and an object of the invention is realizing a high quality solid state imaging device capable of stably storing signals in row memories and reading the signals from the row memories.

In order to achieve the object, the solid state imaging device of the invention includes two row memories provided in parallel.

Specifically, the solid state imaging device of this invention includes an imaging area where a plurality of first pixels and a plurality of second pixels are respectively arranged in the form of a matrix, each of the first pixels and the second pixels having a photoelectric conversion portion and outputting a signal in accordance with brightness of incident light when selected; a plurality of first memories that respectively store signals of selected first pixels out of the plurality of first pixels; a plurality of second memories that are respectively connected in parallel to the first memories and respectively store signals of selected second pixels out of the plurality of second pixels; a horizontal signal line to which the signals stored in the first memories and in the second memories are read; and an output amplifier connected to the horizontal signal line, and an operation for reading the signals stored in the first memories to the horizontal signal line and an operation for outputting the signals from the output amplifier are performed at least partly in parallel with an operation for storing the signals of the selected second pixels out of the plurality of second pixels in the second memories, and an operation for reading the signals stored in the second memories to the horizontal signal line and an operation for outputting the signals from the output amplifier are performed at least partly in parallel with an operation for storing the signals of the selected first pixels out of the plurality of first pixels in the first memories.

The solid state imaging device of this invention includes the plural first memories for storing the signals of the selected first pixels out of the plural first pixels and the plural second memories respectively connected to the first memories in parallel for storing the signals of the selected second pixels out of the plural second pixels. Therefore, the operation for reading signals from pixels and storing them in memories and the operation for outputting the signals stored in the memories can be performed in parallel. Accordingly, there is no need to complete the operation for reading the signals from the pixels and storing them in the memories within a horizontal blanking period included in a horizontal drive period besides a vertical blanking period, and hence, time for storing the signals in the memories can be sufficiently secured. As a result, the signals can be stably stored in the memories and can be stably read from the memories in the present solid state imaging device.

Preferably, in the solid state imaging device of the invention, the plurality of first pixels are disposed on odd rows in the imaging area, the plurality of second pixels are disposed on even rows in the imaging area, the plurality of first memories and the plurality of second memories are disposed correspondingly to respective columns of the imaging area, first pixels disposed on one odd row out of the plurality of first pixels are simultaneously selected, second pixels disposed on one even row out of the plurality of second pixels are simultaneously selected, and the operation for reading the signals stored in the first memories to the horizontal signal line and the operation for outputting the signals from the output amplifier are performed alternately with the operation for reading the signals stored in the second memories to the horizontal signal line and the operation for outputting the signals from the output amplifier.

The solid state imaging device of the invention may further include a plurality of drive pulse lines for driving the plurality of first pixels and the plurality of second pixels, and at least one of the operation for reading the signals stored in the first memories to the horizontal signal line and the operation for outputting the signals from the output amplifier or at least one of the operation for reading the signals stored in the second memories to the horizontal signal line and the operation for outputting the signals from the output amplifier is preferably stopped while a drive pulse is being applied to at least one of the plurality of drive pulse lines. Thus, it is possible to suppress degradation in picture quality caused when noise derived from the drive pulse is superposed on a signal output from a memory.

Alternatively, at least one of the operation for reading the signals stored in the first memories to the horizontal signal line and the operation for outputting the signals from the output amplifier or at least one of the operation for reading the signals stored in the second memories to the horizontal signal line and the operation for outputting the signals from the output amplifier is preferably stopped at a rise and a fall of a drive pulse applied to at least one of the plurality of first pixels and the plurality of second pixels. Thus, noise derived from the drive pulse can be prevented from being superposed on a signal output from a memory and increase in time required for outputting signals from memories can be suppressed.

In this case, the solid state imaging device preferably further includes a horizontal shift register for controlling read of the signals stored in the first memories and the signals stored in the second memories to the horizontal signal line, and an operation of at least one of the horizontal shift register and the output amplifier is preferably stopped when the operation for reading the signals stored in the first memories or the second memories to the horizontal signal line is stopped.

Furthermore, the solid state imaging device preferably further includes a plurality of vertical signal lines each for connecting each column of the plurality of first pixels and the plurality of second pixels to each pair of a first memory and a second memory disposed correspondingly to each column of the plurality of first pixels and the plurality of second pixels, at least a part of the plurality of first pixels and at least a part of the plurality of second pixels preferably includes a floating diffusion portion for reading charge of the photoelectric conversion portion; a read transistor connected between the photoelectric conversion portion and the floating diffusion portion; a reset transistor for initializing a state of the floating diffusion portion; and a detection transistor connected between the floating diffusion portion and the vertical signal line, and the plurality of drive pulse lines include a plurality of read pulse lines connected to gates of the read transistors disposed in the respective rows of the imaging area, a plurality of reset pulse lines connected to gates of the reset transistors and power lines respectively connected to the reset transistors and the detection transistors.

In the solid state imaging device of the invention, the operation for storing the signals of the selected first pixels out of the plurality of first pixels in the first memories and the operation for storing the signals of the selected second pixels out of the plurality of second pixels in the second memories are preferably performed over a horizontal blanking period and a horizontal active period that is included neither in a vertical blanking period nor in a horizontal blanking period. Thus, even when the horizontal blanking period is short, time spent on the operation for reading the signals from the pixels can be sufficiently secured, so as to largely improve the picture quality.

In the solid state imaging device of the invention, at least a part of the operation for reading the signals stored in the first memories to the horizontal signal and the operation for outputting the signals from the output amplifier is preferably performed in parallel with at least a part of the operation for storing the signals of the selected second pixels out of the plurality of second pixels in the second memories in one horizontal blanking period, and at least a part of the operation for reading the signals stored in the second memories to the horizontal signal and the operation for outputting the signals from the output amplifier is preferably performed in parallel with at least a part of the operation for storing the signals of the selected first pixels out of the plurality of first pixels in the first memories in another horizontal blanking period. Thus, even when the horizontal drive period is short, the time spent on the operation for reading the signals from the pixels can be sufficiently secured, so as to largely improve the picture quality.

The solid state imaging device of the invention preferably further includes an analog/digital conversion portion for converting signals sent from the first memories and the second memories into digital signals.

The camera of this invention includes the solid state imaging device of the invention.

The method of this invention for driving a solid state imaging device including a plurality of pixels respectively having photoelectric conversion portions and arranged in the form of a matrix; and a plurality of first memories and a plurality of second memories each receiving signals of pixels of a corresponding column, includes the steps of (a) selecting pixels disposed on one row and storing signals of the pixels disposed on the one row in the first memories; (b) successively reading and outputting the signals stored in the first memories; (c) selecting pixels disposed on another row different from the one row and storing signals of the pixels disposed on the different row in the second memories; and (d) successively reading and outputting the signals stored in the second memories, and the step (b) and the step (c) are carried out in parallel at least partly, and the step (d) and the step (a) are carried out in parallel at least partly.

In the method for driving a solid state imaging device of this invention, an operation for reading signals from pixels and storing them in memories and an operation for outputting signals stored in the memories can be performed in parallel. Accordingly, there is no need to complete the operation for reading the signals from the pixels and storing them in the memories within a horizontal blanking period included in a horizontal drive period besides a vertical blanking period, and hence, time for storing the signals in the memories can be sufficiently secured.

Preferably, in the method for driving a solid state imaging device of the invention, a drive pulse is applied to the pixels disposed on the one row in the step (a), the signals are stopped to be read and output in the step (d) when the drive pulse rises in the step (a), a drive pulse is applied to the pixels disposed on the different row in the step (c), and the signals are stopped to be read and output in the step (b) when the drive pulse rises in the step (c).

In the method for driving a solid state imaging device of the invention, the step (a) and the step (b) are preferably carried out in a horizontal blanking period and in a horizontal active period besides a vertical blanking period and the horizontal blanking period.

In the method for driving a solid state imaging device of the invention, at least part of the step (b) and the step (c) is carried out in parallel in one horizontal blanking period, and at least part of the step (d) and the step (a) is carried out in parallel in another horizontal blanking period.

DETAILED DESCRIPTION OF THE INVENTION

Embodiment 1

Figure 1:
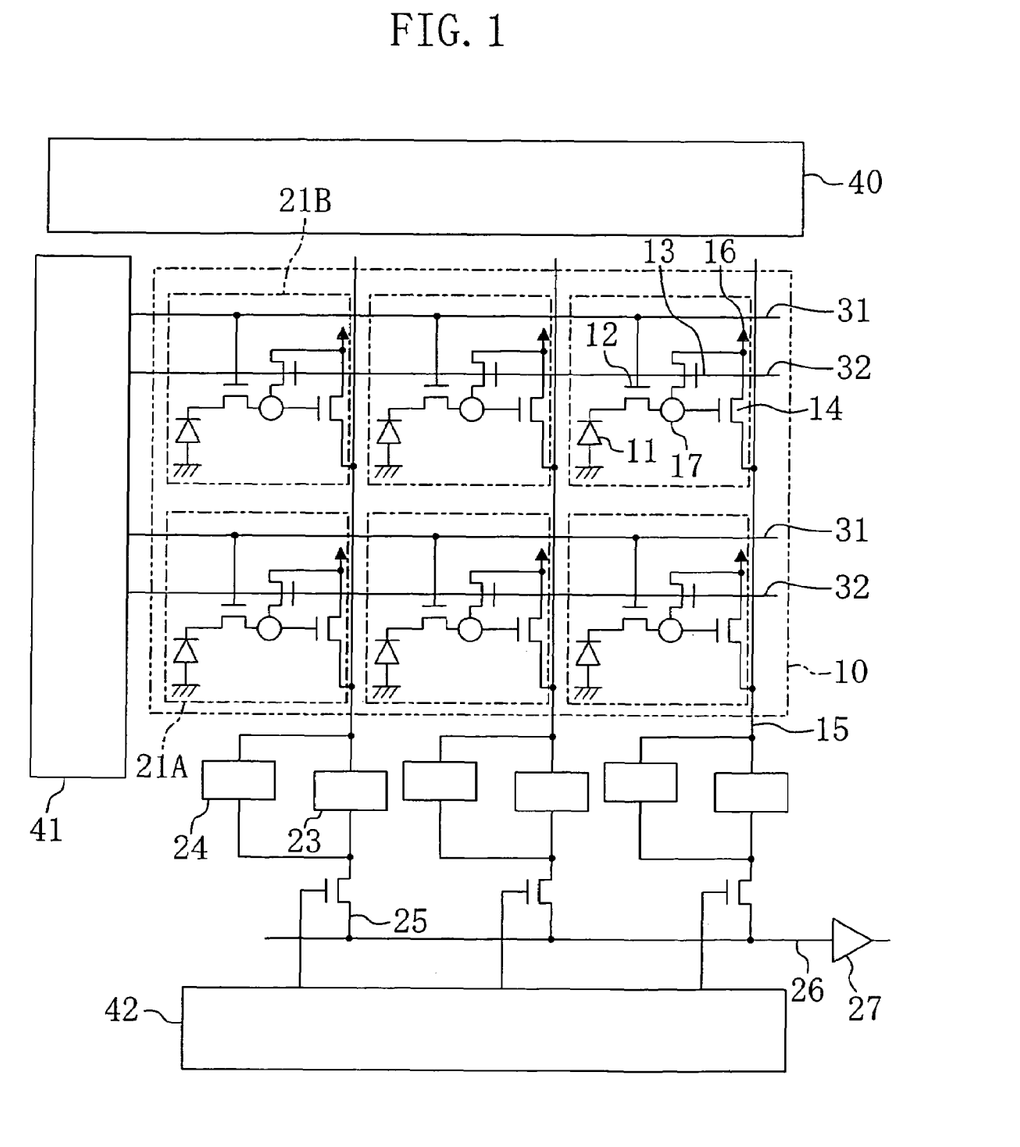
FIG. 1 is a circuit diagram of a solid state imaging device according to Embodiment 1 of the invention.

Embodiment 1 of the invention will now be described with reference to the accompanying drawings. FIG. 1 shows the circuit configuration of a solid state imaging device according to Embodiment 1 of the invention. As shown in FIG. 1, the solid state imaging device of this embodiment has an imaging area 10 where a plurality of amplifying unit pixels 21 are arranged in the form of a matrix. Although the imaging area 10 shown in FIG. 1 has a matrix of two rows by three columns, the numbers of rows and columns can be arbitrarily set.

Each pixel 21 includes a photoelectric conversion portion (PD portion) 11 of a photodiode formed on a semiconductor substrate and a floating diffusion (FD) portion 17 connected to the PD portion 11 through a read transistor 12 for storing charge of the PD portion 11. The FD portion 17 is connected to a $V_{DD}$ power supply 16 through a reset transistor 13 and to a vertical signal line 15 through a detection transistor 14.

The gate of the read transistor 12 is connected to a read pulse line 31, and the gate of the reset transistor 13 is connected to a reset pulse line 32. The read pulse line 31 and the reset pulse line 32 are provided correspondingly to each row of pixels, and the vertical signal line 15 is provided correspondingly to each column of the pixels.

A first memory 23 and a second memory 24 working as row memories for storing signals of pixels of a corresponding one row are connected to each vertical signal line 15, and the first memory 23 and the second memory 24 are connected to each other in parallel. The output terminals of the first memory 23 and the second memory 24 are both connected to a horizontal signal line 26 through a horizontal control transistor 25, and the horizontal signal line 26 is connected to an output amplifier 27.

The read transistor 12 and the reset transistor 13 are driven by a vertical shift register 41, and the horizontal control transistor 25 is driven by a horizontal shift register 42. The vertical shift register 41 and the horizontal shift register 42 are driven by a timing generator 40.

Figure 2:
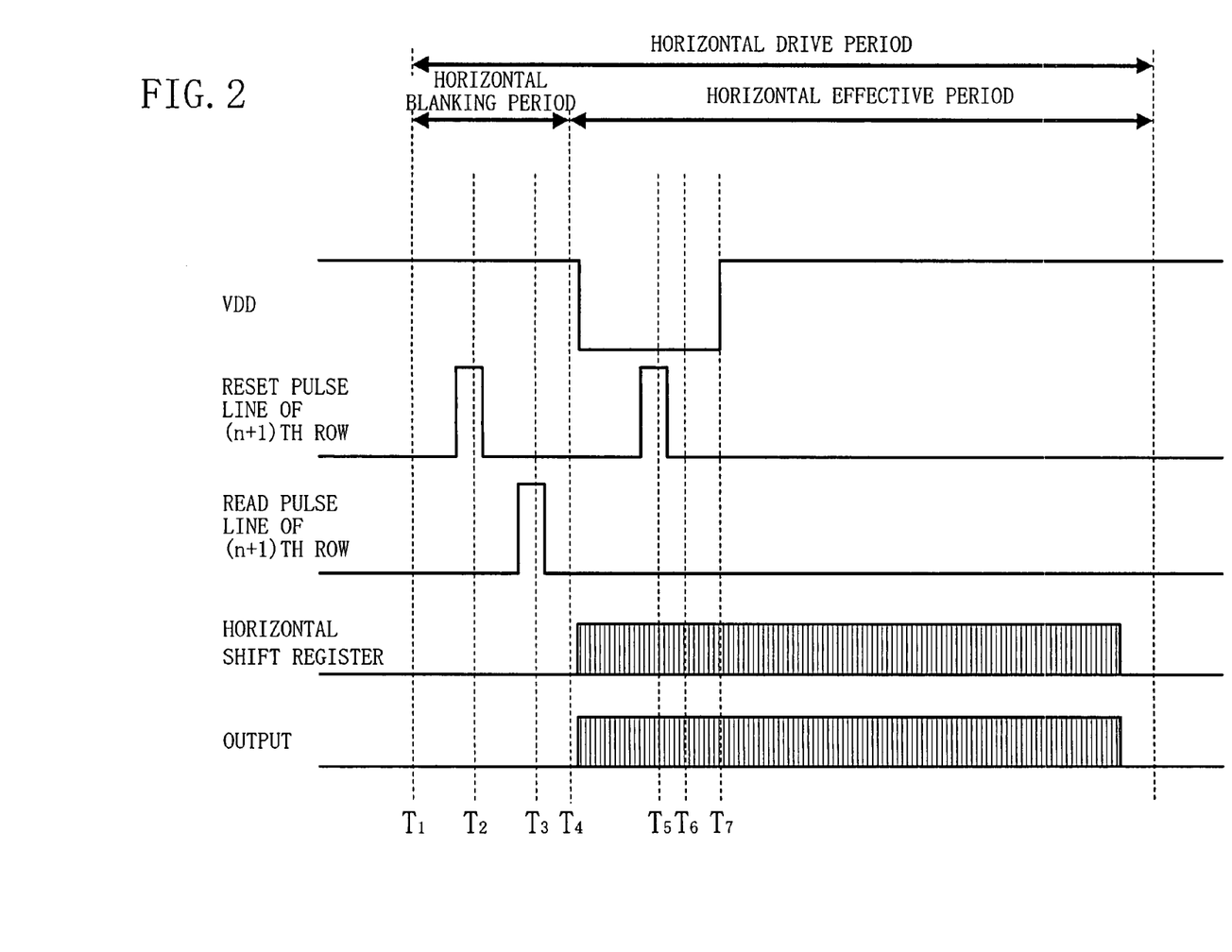
FIG. 2 is a timing chart in a horizontal drive period besides a vertical blanking period of the solid state imaging device of Embodiment 1.

Now, the operation of the solid state imaging device of this embodiment will be described. FIG. 2 is a timing chart in a horizontal drive period besides a vertical blanking period of the solid state imaging device of this embodiment. Although timing for driving a (n+1)th row (wherein n is a positive integer) is shown in FIG. 2, the timing for driving an nth row is substantially the same as that shown in FIG. 2 except that a memory for storing signals and a memory for outputting signals are reversed.

A horizontal drive period is composed of a horizontal blanking period and a horizontal active period. The horizontal blanking period starts at timing $T_1$, and an operation for reading signals from respective pixels 21B disposed on the (n+1)th row and storing them in the second memories 24 is started. The operation for reading the pixel signals of the (n+1)th row includes a series of operations including an operation for selecting each pixel 21B of the (n+1)th row, an operation for resetting the corresponding FD portion 17, an operation for reading charge of the corresponding PD portion 11, an operation for amplifying the charge of the PD portion 11 and an operation for unselecting each pixel 21B of the (n+1)th row.

At timing $T_2$, with a voltage at a high (H) level applied to the $V_{DD}$ power supply 16, a reset pulse is applied to the reset pulse line 32. Thus, the reset transistor 13 is turned on so as to reset the FD portion 17 and select the detection transistor 14 at the same time.

Next, at timing $T_3$, a read pulse is applied to the read pulse line 31, so as to turn on the read transistor 12. Thus, the charge of the PD portion 11 is read to the FD portion 17, and a signal corresponding to the charge read from the PD portion 11 is output to the corresponding vertical line 15 through the detection transistor 14. The signal output to the vertical signal line 15 is stored in the corresponding second memory 24.

Then, after terminating the horizontal blanking period at timing $T_4$, the voltage of the $V_{DD}$ power supply 16 is set to a low (L) level, and a reset pulse is applied again to the reset pulse line 32 at timing $T_5$. Thus, the potential of the FD portion 17 is set to L level, and hence, the detection transistor 14 is placed in an unselected state. Thereafter, the voltage of the $V_{DD}$ power supply 16 is set to H level at timing $T_7$, and thus, the operation for reading the signals from the respective pixels 21B of the (n+1)th row and storing them in the second memories 24 is completed.

On the other hand, after terminating the horizontal blanking period at timing $T_4$, an operation for reading signals of respective pixels 21A of the nth row having been stored in the first memories 23 to the horizontal signal line 26 is started, and the signals read to the horizontal signal line 26 are successively output from the output amplifier 27. In this manner, a part of the operation for reading the signals from the pixels 21B of the (n+1)th row and storing them in the second memories 24 and the operation for outputting the signals of the pixels 21A of the nth row having been stored in the first memories 23 are performed in parallel in the horizontal active period following the horizontal blanking period.

In a conventional solid state imaging device, an operation for reading signals from pixels and storing them in memories and an operation for reading signals from the memories should be separately performed, and therefore, it is necessary to complete the operation for reading the signals from the pixels and storing them in the memories within the horizontal blanking period. In a solid state imaging device for a high quality high-definition image, however, the horizontal blanking period is 4 µsec. or less, and therefore, it is difficult to complete, within this short horizontal blanking period, the operation for reading the signals from the pixels and storing them in the memories.

On the other hand, in the solid state imaging device of this embodiment, the operation for reading the signals from the pixels and storing them in the memories and the operation for reading the signals from the memories can be performed in parallel. Therefore, a part of the operation for reading the signals from the pixels and storing them in the memories can be performed in the horizontal active period besides the horizontal blanking period. Accordingly, since the operation for reading the signals from the pixels and storing them in the memories is allowed to have a time margin, the signals can be stably stored in the memories, and as a result, the picture quality of the solid state imaging device can be largely improved.

Although the signals of the pixels 21A of the nth row are stored in the first memories 23 and the signals of the pixels 21B of the (n+1)th row are stored in the second memories 24 in this embodiment, the signals of the pixels 21A of the nth row may be stored in the second memories 24 and the signals of the pixels 21B of the (n+1)th row may be stored in the first memories 23 as far as the signals are stored in the respective memories alternately.

FIG. 1 shows the case where each pixel includes the reset transistor and the reset pulse line is provided in each row, but the same effects is obtainable even when pixels arranged in plural rows share the reset transistor and the reset pulse line is provided in every plural rows.

Modification 1 of Embodiment 1

Figure 3:
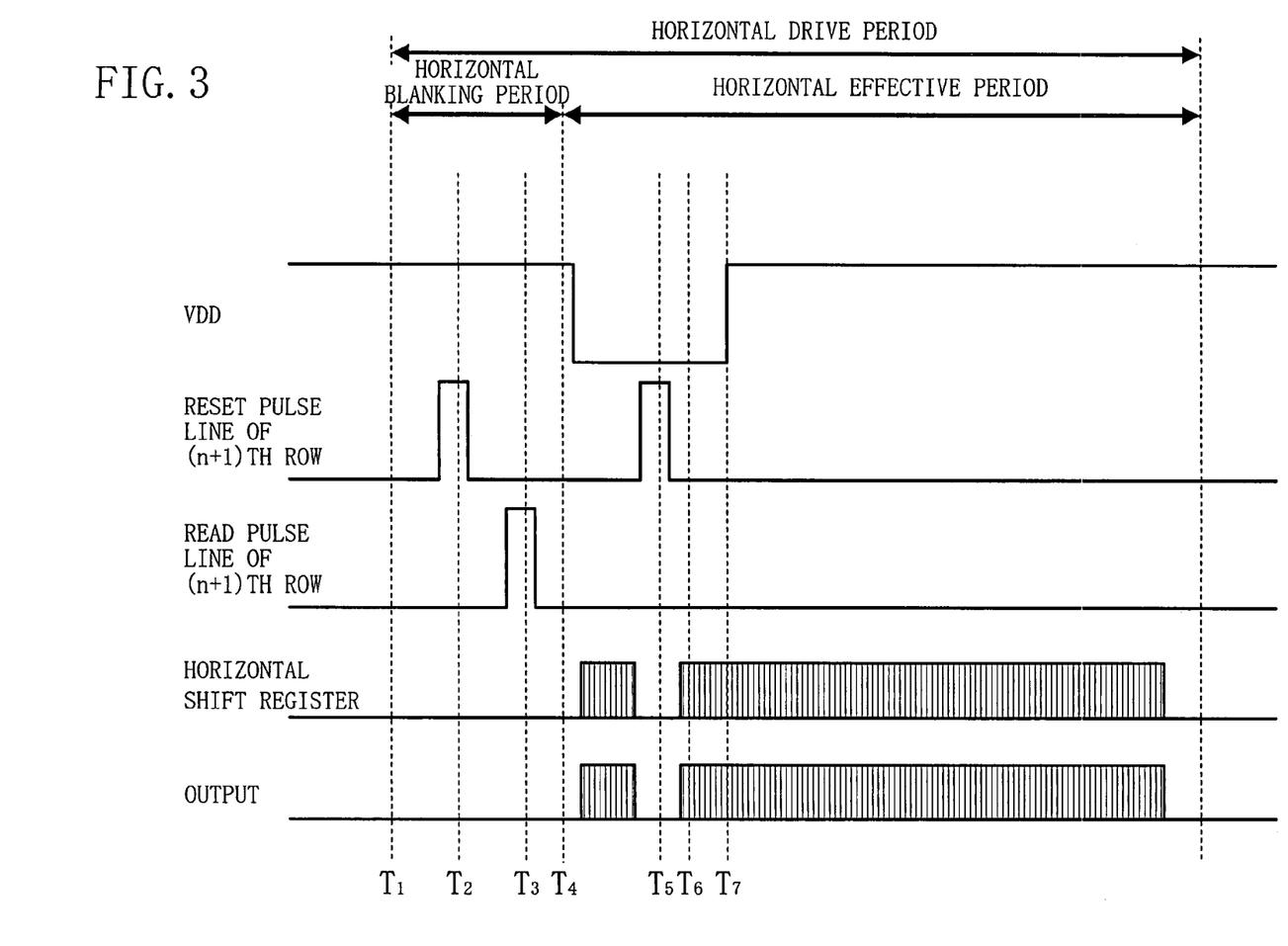
FIG. 3 is a timing chart for showing a driving state of a solid state imaging device according to Modification 1 of Embodiment 1.

FIG. 3 is a timing chart in a horizontal drive period besides a vertical blanking period of a solid state imaging device according to Modification 1 of Embodiment 1. The solid state imaging device of this modification has the same circuit configuration as the solid state imaging device of Embodiment 1. In the solid state imaging device of this modification, while a reset pulse is being applied to the reset pulse line 32, the operation of the horizontal shift register 42 and the operation of the output amplifier 27 for outputting signals are stopped.

In the case where the operation for reading the signals from the respective pixels 21B of the (n+1)th row and storing them in the second memories 24 and the operation for outputting the signals of the respective pixels 21A of the nth row from the first memories 23 are performed in parallel, it is apprehended that when a reset pulse is applied from the reset pulse line 32 to the respective pixels 21B of the (n+1)th row, a crosstalk signal of the reset pulse is superposed as noise on the signals of the pixels 21A of the nth row. When the noise is thus caused, signals ultimately output from the output amplifier include noise, and hence, an image created in accordance with the output signals is largely degraded in the picture quality.

In the solid state imaging device of this modification, while a drive pulse is being applied to the reset pulse line 32, the operation of the horizontal shift register 42 is stopped so as to stop the operation for reading the signals of the pixels 21A of the nth row having been stored in the first memories 23 to the horizontal signal line 26 and the operation for outputting the signals read to the horizontal signal line 26 from the output amplifier 27. Therefore, the signals output from the output amplifier 27 can be free from noise derived from the reset pulse, and hence, an image with high picture quality can be obtained.

Although the operation for reading the signals of the pixels 21A of the nth row from the first memories 23 is described in this modification, the operation of the horizontal shift register 42 is similarly stopped while reading the signals of the pixels 21B of the (n+1)th row from the second memories 24.

Furthermore, in the case where the solid state imaging device includes, apart from the reset pulse line, another drive pulse line to which a dive pulse is applied in the horizontal active period, the operation of the horizontal shift register may be stopped while the drive pulse is being applied to this drive pulse line.

Although the signal output operation is stopped by stopping the horizontal shift register in this modification, it may be stopped by stopping the operation of the output amplifier instead.

Modification 2 of Embodiment 1

Figure 4:
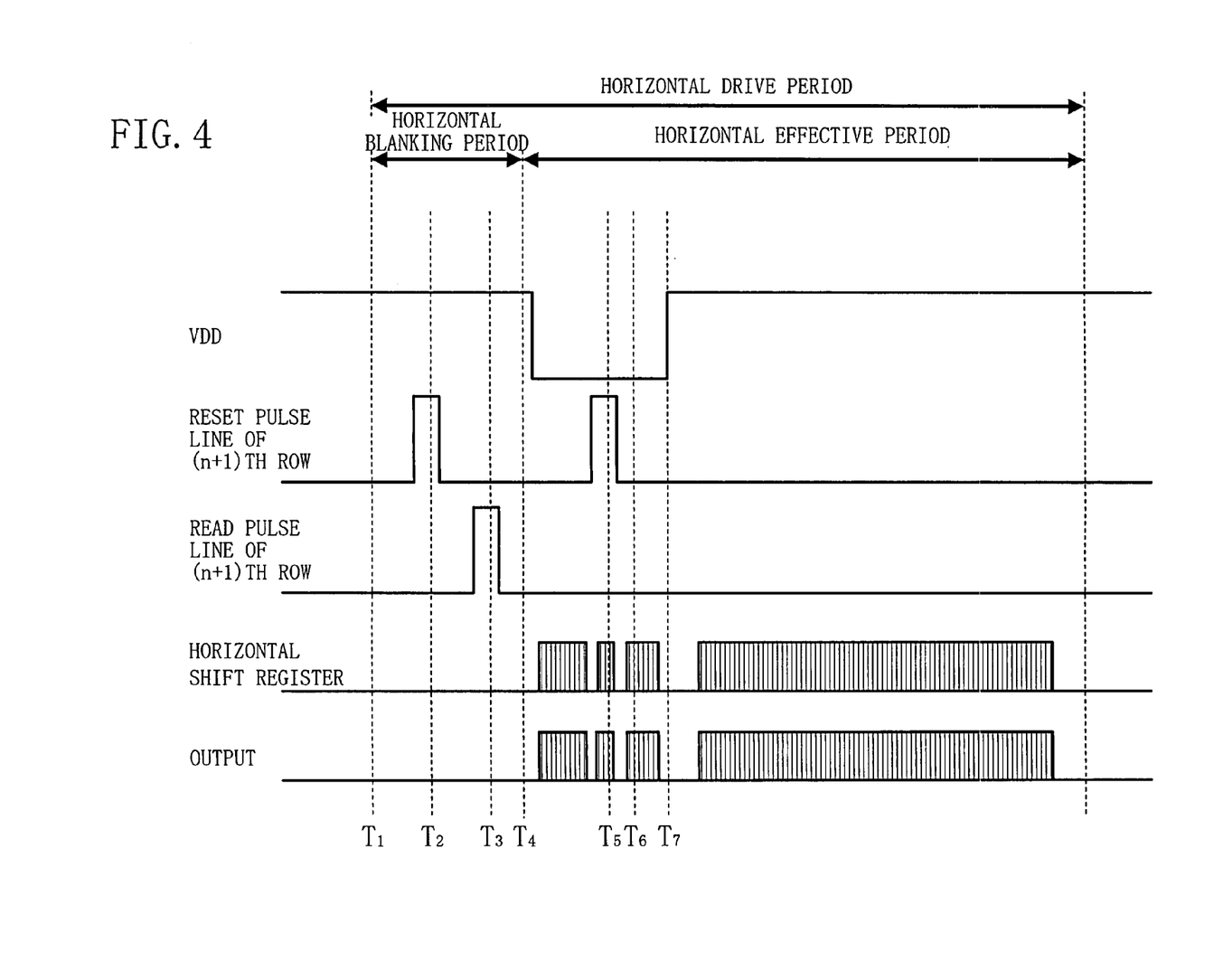
FIG. 4 is a timing chart for showing a driving state of a solid state imaging device according to Modification 2 of Embodiment 1.

FIG. 4 is a timing chart in a horizontal drive period besides a vertical blanking period of a solid state imaging device according to Modification 2 of Embodiment 1. The solid state imaging device of this modification has the same circuit configuration as the solid state imaging device of Embodiment 1. In the solid state imaging device of this modification, the operation of the horizontal shift register 42 and the operation of the output amplifier 27 for outputting signals are stopped at a rise and a fall of a drive pulse applied to a drive pulse line such as the reset pulse line 32.

Noise derived from a drive pulse is easily caused at a rise and a fall of the drive pulse. Therefore, when the operation for reading a signal from a memory is stopped at a rise and a fall of a drive pulse, a signal substantially free from noise derived from the drive pulse can be obtained and time for stopping the output operation can be short.

As a result, the operation for reading signals having been stored in memories to the horizontal signal line can be performed with a time margin, and hence an image can be accurately output so as to attain a high picture quality. Also, the horizontal active period can be shortened by reducing the time spent on the read operation, so as to shorten time necessary for reading signals of one row of pixels. Thus, the number of frames output in unit time can be increased, and therefore, an image can be rapidly output.

In this modification, the output is stopped not only at a rise and a fall on the reset pulse line 32 but also at a rise of the $V_{DD}$ power supply 16, and therefore, the occurrence of noise derived from the $V_{DD}$ power supply 16 can be also suppressed.

Modification 3 of Embodiment 1

Figure 5:
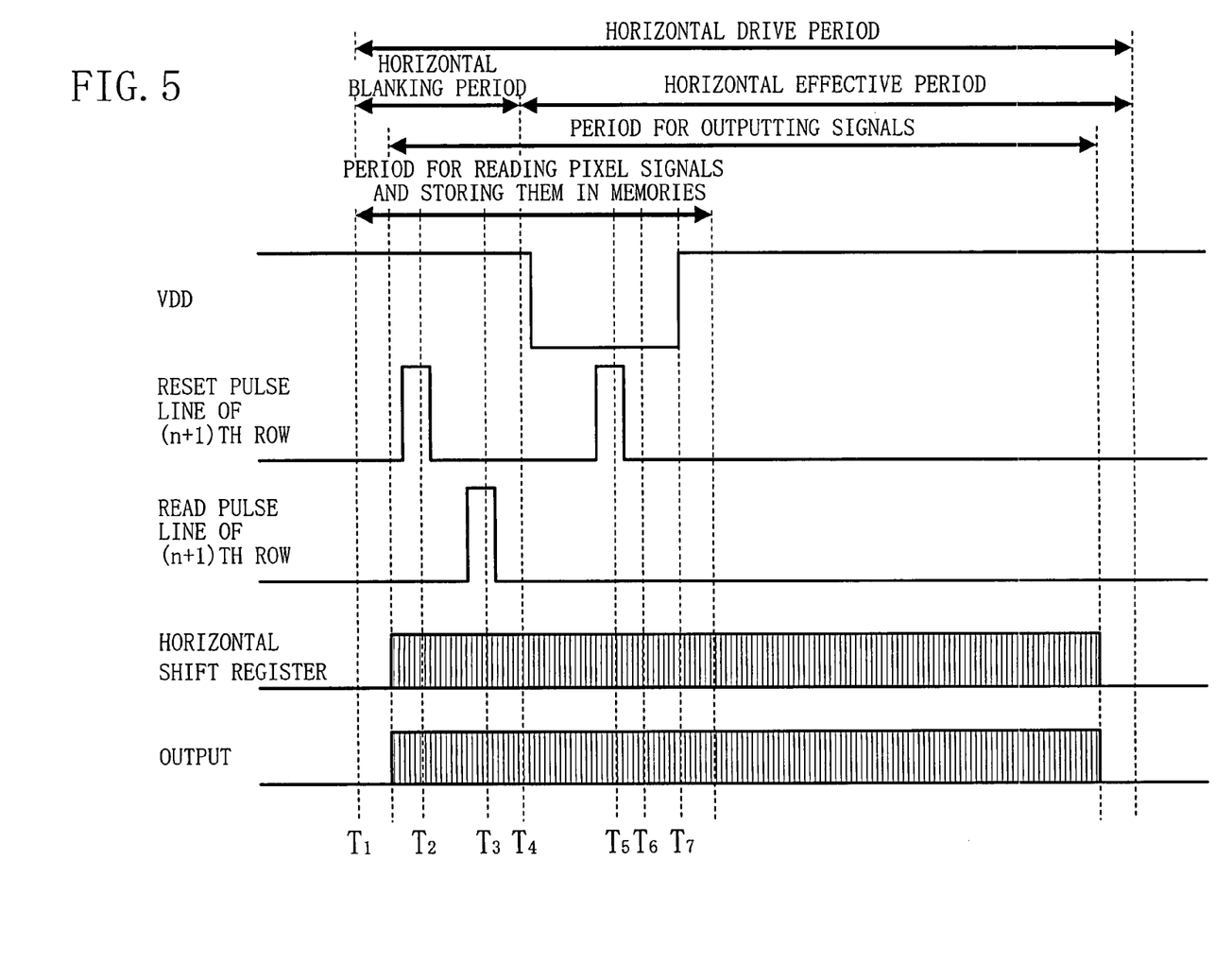
FIG. 5 is a timing chart for showing a driving state of a solid state imaging device according to Modification 3 of Embodiment 1.

FIG. 5 is a timing chart in the horizontal drive period besides the vertical blanking period of a solid state imaging device of Modification 3 of Embodiment 1. The solid state imaging device of this modification has the same circuit configuration as the solid state imaging device of Embodiment 1. In the solid state imaging device of this modification, the operation for outputting the signals of the pixels 21A of the nth row having been stored in the first memories 23 is performed in parallel to the operation for reading the signals of the pixels 21B of the (n+1)th row and storing them in the second memories 24 in the horizontal blanking period.

Therefore, also in a high-definition camera in which a horizontal drive period composed of a horizontal blanking period and a horizontal active period is short, time for reading the signals from the memories can be sufficiently secured, and hence, the signals can be easily read from the memories. As a result, the picture quality can be largely improved.

Modification 4 of Embodiment 1

Figure 6:
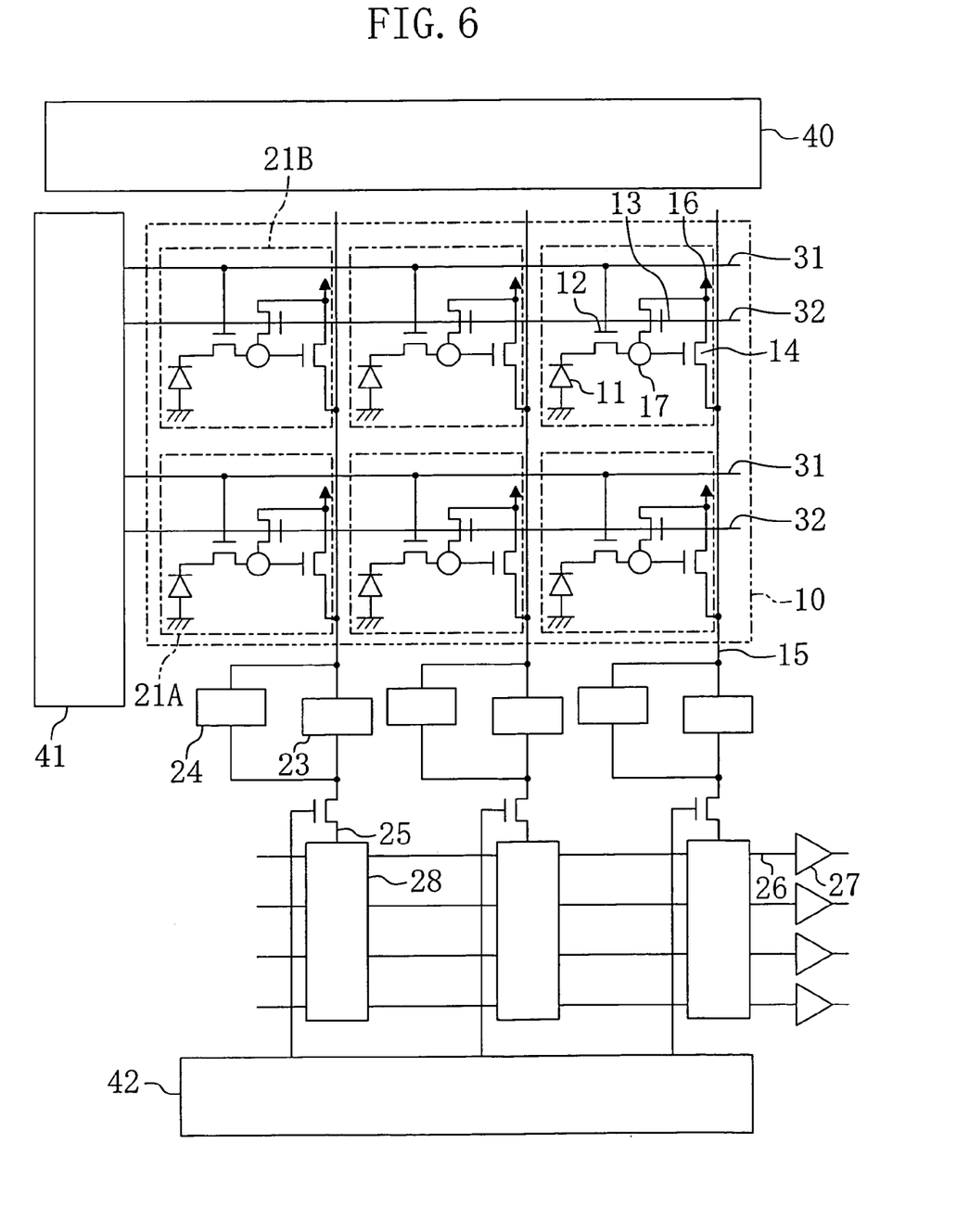
FIG. 6 is a circuit diagram of a solid state imaging device according to Modification 4 of Embodiment 1.

FIG. 6 is a circuit diagram of a solid state imaging device of Modification 4 of Embodiment 1. In FIG. 6, like reference numerals are used to refer to like elements shown in FIG. 1 so as to omit the description. As shown in FIG. 6, the solid state imaging device of this modification includes an AD (analog/digital) conversion portion 28 connected to the output of the horizontal control transistor 25. Thus, a signal read from each pixel is converted into a digital signal, so as to be output as each bit through the horizontal signal line 26 and the output amplifier 27.

Also in such a digital-output solid state imaging device, fast drive can be performed by providing two row memories in parallel. The drive timing may be any of those described in Embodiment 1 and Modifications 1 through 3.

Since the solid state imaging device described in each of Embodiment 1 and Modifications 1 through 3 can be rapidly driven, a camera using such a solid state imaging device can attain a high picture quality and a rapid operation.

As described so far, the solid state imaging device of this invention can stably perform signal storage in row memories and signal read from the row memories and can attain a high picture quality, and therefore, the invention is useful for a solid state imaging device for use in a high-definition camera, a method for driving the same, and a camera using the same.

What is claimed is:

1. A solid state imaging device comprising:
   an imaging area where a plurality of first pixels and a plurality of second pixels are arranged in the form of a matrix, each of said first pixels and said second pixels having a photoelectric conversion portion and outputting a signal in accordance with brightness of incident light when selected;
   a plurality of first memories that respectively store signals of selected first pixels out of said plurality of first pixels;
   a plurality of second memories that are respectively connected in parallel to said first memories and respectively store signals of selected second pixels out of said plurality of second pixels;
   a horizontal signal line to which the signals stored in said first memories and in said second memories are read; and
   an output amplifier connected to said horizontal signal line,
   wherein an operation for reading the signals stored in said first memories to said horizontal signal line and an operation for outputting the signals from said output amplifier are performed at least partly in parallel with an operation for storing the signals of said selected second pixels out of said plurality of second pixels in said second memories, and
   an operation for reading the signals stored in said second memories to said horizontal signal line and an operation for outputting the signals from said output amplifier are performed at least partly in parallel with an operation for storing the signals of said selected first pixels out of said plurality of first pixels in said first memories.

2. The solid state imaging device of claim 1,
   wherein said plurality of first pixels are disposed on odd rows in said imaging area,
   said plurality of second pixels are disposed on even rows in said imaging area,
   said plurality of first memories and said plurality of second memories are disposed correspondingly to respective columns of said imaging area,
   first pixels disposed on one odd row out of said plurality of first pixels are simultaneously selected,
   second pixels disposed on one even row out of said plurality of second pixels are simultaneously selected, and
   the operation for reading the signals stored in said first memories to said horizontal signal line and the operation for outputting the signals from said output amplifier are performed alternately with the operation for reading the signals stored in said second memories to said horizontal signal line and the operation for outputting the signals from said output amplifier.

3. The solid state imaging device of claim 1, further comprising a plurality of drive pulse lines for driving said plurality of first pixels and said plurality of second pixels,
   wherein at least one of the operation for reading the signals stored in said first memories to said horizontal signal line and the operation for outputting the signals from said output amplifier or at least one of the operation for reading the signals stored in said second memories to said horizontal signal line and the operation for outputting the signals from said output amplifier is stopped while a drive pulse is being applied to at least one of said plurality of drive pulse lines.

4. The solid state imaging device of claim 3, further comprising a horizontal shift register for controlling read of the signals stored in said first memories and the signals stored in said second memories to said horizontal signal line,
   wherein an operation of at least one of said horizontal shift register and said output amplifier is stopped when the operation for reading the signals stored in said first memories or said second memories to said horizontal signal line is stopped.

5. The solid state imaging device of claim 3, further comprising a plurality of vertical signal lines each for connecting each column of said plurality of first pixels and said plurality of second pixels to each pair of a first memory and a second memory disposed correspondingly to each column of said plurality of first pixels and said plurality of second pixels, wherein at least a part of said plurality of first pixels and at least a part of said plurality of second pixels includes:
a floating diffusion portion for reading charge of said photoelectric conversion portion;
a read transistor connected between said photoelectric conversion portion and said floating diffusion portion;
a reset transistor for initializing a state of said floating diffusion portion; and
a detection transistor connected between said floating diffusion portion and said vertical signal line, and
said plurality of drive pulse lines include a plurality of read pulse lines connected to gates of said read transistors disposed in the respective rows of said imaging area, a plurality of reset pulse lines connected to gates of said reset transistors and power lines respectively connected to said reset transistors and said detection transistors.

6. The solid state imaging device of claim 1,
wherein at least one of the operation for reading the signals stored in said first memories to said horizontal signal line and the operation for outputting the signals from said output amplifier or at least one of the operation for reading the signals stored in said second memories to said horizontal signal line and the operation for outputting the signals from said output amplifier is stopped at a rise and a fall of a drive pulse applied to at least one of said plurality of first pixels and said plurality of second pixels.

7. The solid state imaging device of claim 6, further comprising a horizontal shift register for controlling read of the signals stored in said first memories and the signals stored in said second memories to said horizontal signal line,
wherein an operation of at least one of said horizontal shift register and said output amplifier is stopped when the operation for reading the signals stored in said first memories or said second memories to said horizontal signal line is stopped.

8. The solid state imaging device of claim 6, further comprising a plurality of vertical signal lines each for connecting each column of said plurality of first pixels and said plurality of second pixels to each pair of a first memory and a second memory disposed correspondingly to each column of said plurality of first pixels and said plurality of second pixels,
wherein at least a part of said plurality of first pixels and at least a part of said plurality of second pixels includes:
a floating diffusion portion for reading charge of said photoelectric conversion portion;
a read transistor connected between said photoelectric conversion portion and said floating diffusion portion;
a reset transistor for initializing a state of said floating diffusion portion; and
a detection transistor connected between said floating diffusion portion and said vertical signal line, and
said plurality of drive pulse lines include a plurality of read pulse lines connected to gates of said read transistors disposed in the respective rows of said imaging area, a plurality of reset pulse lines connected to gates of said reset transistors and power lines respectively connected to said reset transistors and said detection transistors.

9. The solid state imaging device of claim 1,
wherein the operation for storing the signals of said selected first pixels out of said plurality of first pixels in said first memories and the operation for storing the signals of said selected second pixels out of said plurality of second pixels in said second memories are performed over a horizontal blanking period and a horizontal active period that is included neither in a vertical blanking period nor in a horizontal blanking period.

10. The solid state imaging device of claim 1,
wherein at least a part of the operation for reading the signals stored in said first memories to said horizontal signal line and the operation for outputting the signals from said output amplifier is performed in parallel with at least a part of the operation for storing the signals of said selected second pixels out of said plurality of second pixels in said second memories in one horizontal blanking period, and
at least a part of the operation for reading the signals stored in said second memories to said horizontal signal line and the operation for outputting the signals from said output amplifier is performed in parallel with at least a part of the operation for storing the signals of said selected first pixels out of said plurality of first pixels in said first memories in another horizontal blanking period.

11. The solid state imaging device of claim 1, further comprising an analog/digital conversion portion for converting signals sent from said first memories and said second memories into digital signals.

12. A camera comprising the solid state imaging device of claim 1.

13. A method for driving a solid state imaging device including a plurality of pixels respectively having photoelectric conversion portions and arranged in the form of a matrix; and a plurality of first memories and a plurality of second memories each receiving signals of pixels of a corresponding column, comprising the steps of:
(a) selecting pixels disposed on one row and storing signals of said pixels disposed on said one row in said first memories;
(b) successively reading and outputting the signals stored in said first memories;
(c) selecting pixels disposed on another row different from said one row and storing signals of said pixels disposed on said different row in said second memories; and
(d) successively reading and outputting the signals stored in said second memories,
wherein the step (b) and the step (c) are carried out in parallel at least partly, and
the step (d) and the step (a) are carried out in parallel at least partly.

14. The method for driving a solid state imaging device of claim 13,
wherein a drive pulse is applied to said pixels disposed on said one row in the step (a),
the signals are stopped to be read and output in the step (d) when said drive pulse rises in the step (a),
a drive pulse is applied to said pixels disposed on said different row in the step (c), and
the signals are stopped to be read and output in the step (b) when said drive pulse rises in the step (c).

15. The method for driving a solid state imaging device of claim 13,
wherein the step (a) and the step (b) are carried out in a horizontal blanking period and in a horizontal active period besides a vertical blanking period and the horizontal blanking period.

16. The method for driving a solid state imaging device of claim 13,
wherein at least part of the step (b) and the step (c) is carried out in parallel in one horizontal blanking period, and
at least part of the step (d) and the step (a) is carried out in parallel in another horizontal blanking period.

* * * * *